Aug. 20, 1963  F. O. E. SCHULTZ  3,101,091
MOISTURE EJECTION VALVE
Filed March 31, 1958  2 Sheets-Sheet 1

INVENTOR.
FORREST O.E. SCHULTZ
BY
ATTORNEY.

Aug. 20, 1963

F. O. E. SCHULTZ 3,101,091

MOISTURE EJECTION VALVE

Filed March 31, 1958

INVENTOR.
FORREST O. E. SCHULTZ
BY Irwin L. Groh
ATTORNEY.

3,101,091
MOISTURE EJECTION VALVE
Forrest O. E. Schultz, Owosso, Mich., assignor to Midland-Ross Corporation, Cleveland, Ohio, a corporation of Ohio
Filed Mar. 31, 1953, Ser. No. 725,397
12 Claims. (Cl. 137—204)

This invention relates to devices for expelling liquid from a compressed air system and more particularly to devices of the type normally referred to as moisture expulsion or moisture ejecting valves.

Liquid, particularly moisture, has a tendency to accumulate in compressed air systems and causes damage by way of corrosion and excessive wear of the various components of the system. Furthermore, in cold weather moisture may freeze within the system and damage parts by distorting them or prevent their movement so that the system cannot be operated until the accumulated moisture is melted.

Devices in present use are generally unsatisfactory for a number of reasons. Usually they rely on an air stream exhausting from the system to blow out accumulated liquid which includes not only moisture but also oil. Not only does this result in the use of large quantities of air but the ejecting device must incorporate a number of moving parts which may lodge in a position which leaves the air system open to the atmosphere. This can be very dangerous, particularly with air brakes or suspension systems on vehicles.

Other types of devices operate successfully only if the operation is begun with a system relatively free of moisture. However, the usual condition when the system is set in operation is one in which a maximum amount of moisture has accumulated due to the condensation of prior operations. Consequently, any device which is not capable of operating under all conditions, where the moisture is at a minimum or at a maximum, is unsatisfactory since a manual draining is ordinarily required to bring about a condition of minimum moisture so that the ejecting device may begin to function properly.

Still another limitation of ejecting devices is that they must be used in specific locations, for example, in conjunction with air reservoirs or components which are subjected to relatively constant pressure. However, moisture tends to accumulate in other locations and some of these locations are subjected to widely variable pressures. Consequently, different types of devices are desirable in different portions of the system but this is usually not practical because the complexity of such devices makes them expensive.

It is the general object of this invention to provide a moisture ejecting device for compressed air systems which utilizes a minimum amount of air of the system to eject a charge of liquid.

Another object of the invention is to provide a moisture ejecting device in which a moving chamber receives air and moisture in the system and transports it to another position outside of the system.

It is another object of the invention to provide a moisture ejecting device in which a quantity of air is used to eject a quantity of moisture from a chamber, the chamber being so constructed and arranged that it is incapable of being completely filled with moisture.

A further object of the invention is to provide a moisture ejecting device in which operation is not limited by excessive quantities of moisture and in which proper operation of the device is obtained at all times whether or not moisture in the system is at a minimum or at a maximum.

It is another object of the invention to provide a moisture ejecting device in which failure of moving parts in any position of operation leaves the compressed air system sealed from the atmosphere.

A more specific object of the invention is to provide a moisture ejecting device in which a chamber is open adjacent a bottom portion to receive a charge of air and liquid and in which the chamber is movable to a position isolated from the system so that the charge of air forces the charge of moisture to the atmosphere.

Still another object is to provide means for protecting the ejecting device from damage due to freezing of accumulated moisture.

In addition, it is an object to attain the foregoing objects with an automatically operable device which utilizes a minimum number of parts and is so simple to construct that it may be made not only in exceedingly small sizes for use where space is at a premium but also so economically that it is practical to use several devices in the same system.

The foregoing and other objects and advantages are attained by the present invention, various novel features of which will be apparent from the following description and from the accompanying drawings disclosing a preferred embodiment of the invention.

Referring to the drawings.

Figure 1:
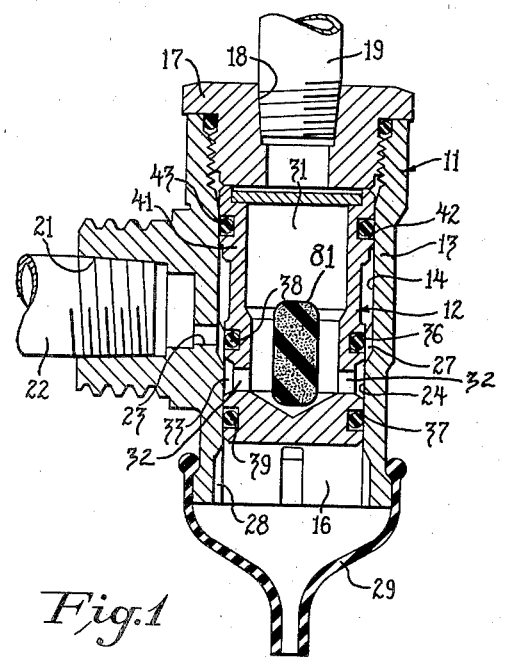
FIG. 1 is a sectional view of a moisture ejecting device embodying the invention and shown in a moisture receiving position.

Referring to the drawings, each of the illustrated embodiments of the invention incorporates two principal components, namely, a housing 11 and a piston or carriage member 12 reciprocally supported in the housing.

As seen in FIG. 1, the housing 11 comprises a body member 13 having an elongated, vertically disposed bore 14. The lower end of the bore has an opening 16 to atmosphere and the upper end is provided with a threaded plug 17 which may be removed for servicing of the carriage 12. The plug is provided with a threaded opening 18 adapted to receive an air carrying control line 19 of a compressed air system.

The bore 14 of the valve body communicates with a radially extending port 21 disposed intermediate the upper and lower ends of the body. The port is internally threaded to receive an air supply line 22 of a compressed air system. The port 21 is reduced in size by a port 23 through which air and moisture may be admitted to the bore 14 of the body. The body bore is reduced in size by an annular portion 24 disposed below the port 23 and forming a wide cylindrical seat in which the carriage or piston 12 is slidably supported. The portion of the bore above the seat forms a receptacle or inlet means for receiving liquid and air. The portion below the seat may be considered as the outlet portion of the bore. Extending in opposite directions from the seat 24 are axially extending flutes 27 and 28 which act as guides for the piston and hold piston seals in position during movement of the piston. The lower portion of the body member is provided with a flexible protecting device or boot 29 which has an opening to atmosphere.

The carriage member or piston 12 has an elongated, hollow portion 31 closed at its opposite ends to form an ejection chamber. Passage means in the form of a plurality of radially extending ports 32 are formed at the bottom of the chamber 31 to place the latter in communication with a circumferential groove 33 which is constantly exposed to the bore of the body. Grooves 36 and 37 are provided above and below the circumferential groove 33 to receive identical O ring seals 38 and 39 which are spaced apart a distance slightly less than the axial width of the annular seat 24. During movement of the piston 12 at least one of the rings 38 or 39 is in engagement with the seat at all times so that portions of the bore 14 above the seat member 24 are continuously sealed from the atmosphere for all positions of the piston. When the piston 12 is in the position shown in FIG. 1, the flutes 27 hold the upper seal 38 in its groove and when the piston is in the FIG. 2 position, the flutes 28 hold the lower seal 39 in its groove. The upper end 41 of the piston is of enlarged diameter and is provided with a groove 42 which holds an O ring seal 43 having a larger diameter than the seals 38 and 39.

Figure 2:
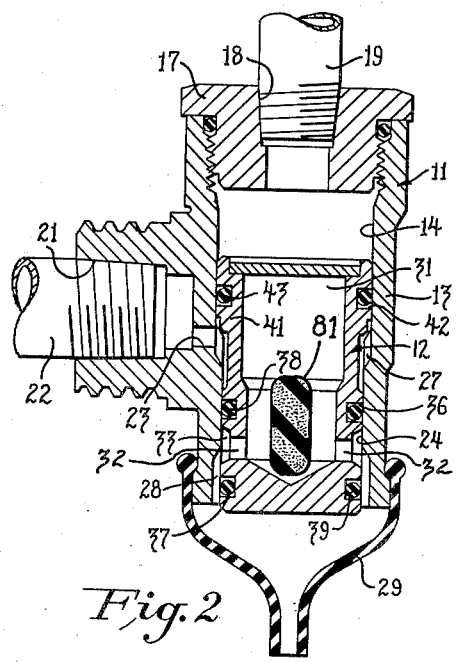
FIG. 2 is a sectional view similar to FIG. 1 but showing another condition of operation in which moisture is ejected from an air system.
Figure 5:
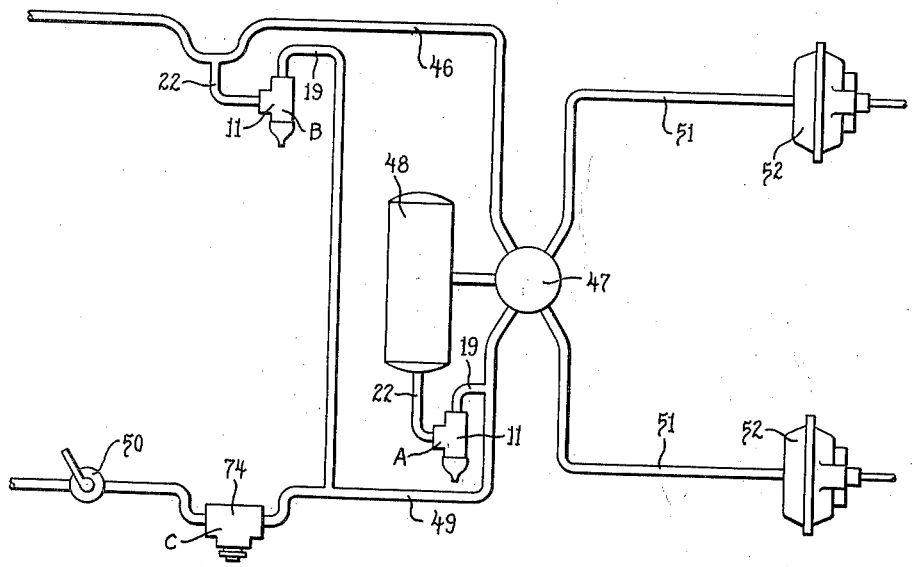
FIG. 5 is a diagrammatic view illustrating the moisture ejecting devices shown in FIGS. 1 and 4 in operating relation to various components of a compressed air system having portions under relatively constant pressure and variable pressure.

Operation of the moisture ejecting device shown in FIGS. 1 and 2 can best be understood in connection with an actual compressed air system. As an example, FIG. 5 illustrates a portion of an air brake system used on vehicles. In such a system, compressed air is delivered from a compressor (not shown), through a supply line 46, to a relay valve 47 and then to a reservoir 48. Air in such portions of the system may be considered as being at a relatively constant pressure. Air pressure is introduced into a control line 49 in response to manual operation of a control valve 50 to actuate the relay valve to permit delivery of air from the reservoir 48 through the relay valve 47 and lines 51 to brake applying motors 52. The control air pressure fluctuates over a wide range when brakes are applied and the control line may be considered as a variable pressure portion of the system. In FIG. 5, the moisture ejecting device shown in FIGS. 1 and 2 may be positioned at A with the line 22 connected to the bottom of the reservoir and with the line 19 connected with the variable pressure control line 49. As an alternative or as additional means for ejecting moisture from the system, an identical ejecting device may be positioned as at B with the line 22 connected to the supply line 46 at a low point where liquid may tend to accumulate. The line 19 is connected to the control line 49. The operation of the ejecting device is the same in either of the positions indicated at A and B.

Referring again to FIG. 1, the piston 12 is shown in its normal operating position in readiness to receive a charge of moisture and air. Any moisture which accumulates at the bottom of the reservoir or at a low point in the system will flow through the line 22, port 21 and opening 23 where it will flow into the circumferential groove 33 and through the radial passages 32 into the chamber 31. As moisture enters the chamber, air is trapped in the chamber above the liquid level at a pressure which is equal to the pressure in the reservoir or supply line 22. In this condition of operation, the moisture ejecting device is in readiness for actuation. Subsequently, when air is introduced to the control line 49 (FIG. 5) to actuate the brakes, air is also introduced through the branch line 19 and threaded port 18 to act on the upper end 51 of the piston over an area defined by the diameter of the large seal 43. This forces the piston 12 to move downwardly so that the upper seal 38 moves into engagement with the seat 26 and thereafter the lower seal 39 moves out of engagement with the seat and opens the circumferential groove 33 to the atmosphere. Since air has been trapped above the liquid level in the chamber 31 at a pressure equal to that of the system and since the circumferential groove is now exposed to the atmosphere, liquid is expelled from the chamber by the force of the trapped air. The volume of air utilized in this manner is extremely small and yet very effective to eject the liquid.

During the ejection portion of the cycle, as shown in FIG. 2, the upper seal 38 remains in contact with the annular seat 26 so that the reservoir and the various lines of the system are sealed from the atmosphere. When the air pressure is released from the control line 49 (FIG. 5), for example, when the brakes are released, the pressure in the control line will be approximately equal to atmospheric pressure. Consequently, the high pressure air from the reservoir 48 will act through line 22 downwardly against the upper seal 38 (FIG. 2) and upwardly against the large seal 43. Because of the difference in the diameters of the two seals, the pressure in the line 22 will be effective to move the piston 12 upwardly to return it to the position shown in FIG. 1 where the piston will be positioned in readiness to receive another charge of air and liquid. In the absence of air pressure in the control line 49, pressure in the line 22 is effective to maintain the piston 12 in the loading position shown in FIG. 1.

Figure 3:
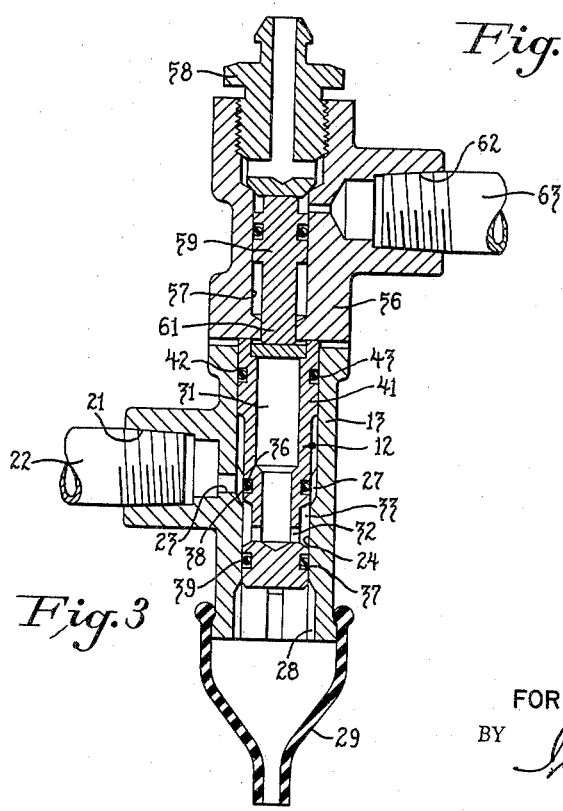
FIG. 3 is a sectional view of another embodiment of the invention.

It will be understood that an ejecting device such as that described in connection with FIGS. 1 and 2 could be actuated by means other than air pressure. The embodiment illustrated in FIG. 3 is particularly adapted for used in conjunction with air systems in which the pressure is relatively constant and is to be actuated by variable hydraulic pressure. For example, in an automobile employing air suspension, the line 22 may be connected to a point in the air system and the carriage 12 may be moved from a moisture loading to an unloading position in response to application of the hydraulic brakes.

The details of the carriage 12 and the body member 13 are the same as those discussed in connection with the device shown in FIGS. 1 and 2. However, the hydraulic actuating means includes an auxiliary housing 56 rigidly mounted on the upper end of the body member 13. The auxiliary housing 56 has a bore 57 axially aligned with the bore 14 of the body member 13. The bore 57 is closed at its upper end by a bleeder screw 58 of a type well known in the hydraulic art and used to remove air trapped in the hydraulic system. A piston member 59 is slidably supported in the bore 57 and one end of its rod portion 61 is engageable with the upper end of the carriage 12. The bore 57 communicates through a port 62 with a hydraulic line 63 which may be connected to a selected point at the output side of a master cylinder conventionally used in hydraulic brake systems. Upon application of the brakes, hydraulic pressure is increased in the line 63 and is exerted on the upper end of the piston 59 so that it moves downwardly and pushes the carriage 12 from a moisture loading position as shown in FIG. 3 to a moisture unloading position, not illustrated but similar to that shown in FIG. 2. When the brakes are released, the pressure in the air system is effective on the lower side of seal 43 to move the carriage 12 upwardly and return the piston 59 to its initial position.

Figure 4:
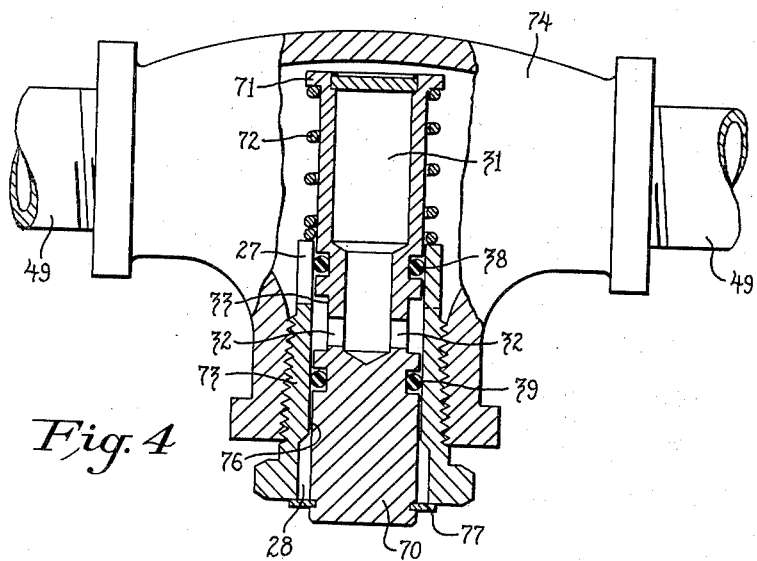
FIG. 4 is a modified form of the moisture ejecting device embodying the invention and adapted for use in variable pressure locations in an air system.

The embodiments described in connection with FIGS. 1, 2 and 3 are principally for use in portions of a compressed air system having a relatively constant pressure. The modification shown in FIG. 4 is for use in variable pressure portions of such systems, for example as at C in the control line 49 of the air brake system shown in FIG. 5. The piston 70 forming the ejection chamber 31 is essentially the same as the carriage 12 shown in the other embodiments in that it includes a circumferential groove 33, radial passages 32 and a pair of seals 38 and 39 at opposite sides of the passages. The upper end of the piston 70 is provided with a flange portion 71 which forms a seat for one end of a spring 72 seated at its opposite end on the valve body 73. The valve body 73 is in the form of a threaded collar which is adapted to be detachably connected in a line fitting such as a pipe T 74 inserted at a point in the control line 49. The bore portion of the collar 73 is provided with an axially elongated valve seat 76 which coacts with the seals 38 and 39 in the same manner as the seat 24 in FIGS. 1 and 3. The bottom portion of the carriage 12 is provided with a snap ring 77 which engages the bottom of the body member to form a stop limiting the upward movement of the carriage 12.

Operation of the modification shown in FIG. 4 is generally similar to that shown in FIGS. 1 and 3 in that moisture which accumulates in the pipe T enters the circumferential groove 33 between the seals 38 and 39 and passes through the passages 32 into the chamber 31. When air is introduced into the control line 49, the pressure of the air above the liquid in the chamber 31 is increased to equal that in the line. At the same time the pressure acts on the lower seal 39 to move the piston 12 downwardly and compresses the spring 72. As the lower seal 39 approaches the lower end of the annular seat 76, the upper seal 38 engages the upper end of the seat and the pressure acts thereon to force the piston 70 downwardly an additional amount until the lower seal 39 moves off the seat and opens the circumferential groove 33 to the atmosphere. Under these conditions the pressure in the upper portion of the chamber 31 is relatively high when compared with the atmospheric pressure and this causes the liquid to be ejected through the radial passages and the circumferential groove to the atmosphere.

When the pressure is exhausted from the control line 49, the spring 72 is effective to return the carriage 70 to its initial position to receive additional charges of air and liquid.

In all of the embodiments and modifications of the invention illustrated in FIGS. 1, 3 and 4, the chamber 31 is so arranged that liquid which enters the chamber is always accompanied by a charge of air at the pressure existing in the air system. When the chamber is open to the atmosphere, the charge of relatively high pressure air becomes effective instantly to eject all of the liquid with considerable force. On the other hand, if the chamber 31 could be completely filled with liquid, no air pressure would be available to force the liquid and it would drain slowly from the chamber due to gravity. Since liquid tends to adhere to metallic parts, particularly when the parts are small, the ejecting chamber would have to be open to the atmosphere for a relatively long time. Even then, the carriage might return to its liquid loading position before it is emptied. In the present device, the ejection chamber 31 is completely closed except for openings adjacent the bottom. Consequently, the air lines may be completely filled with water or other liquid and yet some air will always be trapped above the passage 32 so that it will compress as the liquid level rises. Later when the ejecting device is actuated, the compressed charge of air will blow the liquid from the chamber.

One of the principal difficulties caused by accumulated moisture in a compresesd air system is that it freezes in cold weather. The devices embodying the present invention are effective to maintain a system relatively free of moisture since they are operated automatically and frequently. However, if moisture accumulates and turns to ice, the system may be operated without difficulty since the inoperative ejecting device maintains the system constantly isolated from the atmosphere. When the ice melts, the ejecting device resumes normal operation without requiring any additional attention or adjustment. Because of the expansion of the ice, tremendous pressures may be exerted on the ejecting device so that the parts become distorted to interfere with proper operation. For example, the carriage member 12 may be distorted radially by ice in the chamber 31. In the present device, means are provided for eliminating this problem.

Referring particularly to FIGS. 1 and 2, a pellet 81 of compressible, resilient matter, for example sponge rubber, is disposed in the chamber 31. The pellet is generally cylindrical in shape although other shapes are satisfactory. The pellet does not interfere with operation of the ejecting device since its smallest dimension is larger than the width of the radial ports 32. Consequently, if one of the ports should become blocked by the pellet, another port is available to permit the liquid to be ejected from the chamber. The pellet 81 retains its shape when it is immersed in liquid. However, when the liquid freezes and expands, the pellet is compressed to absorb the resulting forces and prevents them from being imposed on the walls of the chamber 31. Although the pellet element is shown in conjunction with FIGS. 1 and 2, it is to be understood that similar elements may be used with the embodiments shown in FIGS. 3 and 4.

Because of the simple components and the minimum number of moving parts and because the problem of liquid adhering to the parts has been avoided, the subject invention may be embodied in a very small ejecting device. This, of course, reduces the cost of manufacture and facilitates installation in locations where space is limited. In actual practice it has been found that devices less than one-half the size of those illustrated in the drawings may be operated with complete efficiency.

It will be apparent that a simple moisture ejecting device has been provided which may be actuated automatically to eject liquid from a compressed air system and that the few parts coact in a novel manner so that liquid is positively ejected by air pressure without opening the air system to the atmosphere at any time. This not only conserves air but protects the system in the event the ejecting device malfunctions. Furthermore, the ejecting device is protected from damage due to the freezing of moisture which might accumulate in the ejecting device when the compressed air system is not being used.

It should be understood that it is not intended to limit the invention to the above described forms and details, and that the invention includes such other forms and modifications as are embraced by the scope of the appended claims.

It is claimed and desired to secure by Letters Patent:

1. A moisture ejecting device for a compressed air system, comprising a cylinder forming an annular seat therein, a carriage member movably supported in said seat and projecting to opposite sides thereof, said cylinder and carriage member forming a receptacle above said seat for receiving a supply of compressed air and liquid, said carriage member having an ejection chamber therein, passage means formed in said carriage member and extending radially from the bottom of said ejection chamber to place the latter in communication with said receptacle, said carriage member being movable from a position in which said passage means communicate with said receptacle to receive a charge of liquid and compressed air through a position in which said seat closes said passage means from the system and the atmosphere and to a position below said seat in which said passage means is open to the atmosphere and the compressed air in the charge is effective to discharge the liquid from said chamber, and means for moving said carriage member between said positions.

2. A moisture ejecting device for a compressed air system comprising a body member having a vertically disposed bore, a carriage member supported for sliding movement in said bore, passage means formed in said carriage and communicating with said bore, said carriage member forming a chamber disposed above said passage means and communicating with the latter, an annular seat member formed in said bore and cooperating with said carriage member to form an inlet portion and an outlet portion in said bore, said carriage member being movable from a loading position in which said passage means is in communication with said inlet portion to admit liquid and air to said chamber to an intermediate position in which said passage means is closed by said seat member, said carriage member being movable from said intermediate position to an unloading position in which said passage means is open to said outlet portion and the air in said chamber discharges the liquid from said chamber, means connected to said carriage member to urge it toward said loading position, and control means for moving said carriage member from said loading position to said unloading position.

3. In a moisture ejecting device for an air system, the combination of, a vertically extending hollow body member having an upper inlet portion and a lower outlet portion adapted to communicate with a source of air under pressure and the atmosphere, respectively, a cylindrical seat formed in said body member intermediate said portions, a carriage member supported in said body member for reciprocating movement in said seat, means forming a vertically extending chamber in said carriage member, passage means formed in said carriage member adjacent a lower portion of said chamber and placing the latter in communication with said hollow body member, seal means mounted on said carriage at opposite sides of said passage means, said carriage member being movable between a loading and an unloading position in which said passage means is in communication with said inlet portion and said outlet portion, respectively, said seal means being spaced axially on said carriage member a distance less than the axial extent of said seat to afford engagement of said seat with at least one of said seals for all positions of said carriage member to maintain said inlet and outlet portions continuously closed to each other.

4. A moisture ejecting mechanism for a compressed air system, a body member having a generally vertically disposed bore, a reduced portion in said bore forming an annular seat extending axially in said bore, said bore having a portion above said seat adapted to communicate with said system and a portion below said seat communicating with the atmosphere, a valve member disposed in said bore and slidably supported in said seat, said valve member forming an ejection chamber therein, passage means formed in said valve member and extending radially from said chamber adjacent a lower portion thereof and placing said chamber in communication with said bore, said valve member having a liquid receiving position in which said passage means communicates with said bore above said seat and liquid occupies a lower portion of said chamber and air occupies an upper part of said chamber, said valve member being movable to a moisture ejecting position in which said passage communicates with said bore below said seat and the air in said chamber forces the liquid therefrom, seal means spaced axially of said valve member at opposite sides of said passage means, said seal means being spaced apart a distance less than the axial extent of said seat, control means forming a part of said valve member and being selectively operable to move said valve member in one direction from said moisture receiving position in which the lower one of said seals is in engagement with said seat to said moisture ejecting position in which the upper one of said seals is in engagement with said seat, and means associated with said valve member and said bore for automatically returning said valve member from said moisture ejecting position to said moisture receiving position when said control means is not in operation.

5. In a moisture ejecting device for a compressed air system having a portion at a relatively constant pressure and a portion subject to variable pressure, the combination of a cylinder open at one end to the atmosphere, a control port formed adjacent the other end of said cylinder and adapted for connection to a portion of a compressed air system subject to variable pressure, an inlet port formed by said cylinder intermediate said one end and said control port, said inlet port being adapted to receive a relatively constant supply of air under pressure, and an annular seat formed in said cylinder between said inlet port and said one end, a carriage member mounted to reciprocate in said seat, chamber means formed in said carriage member for containing air and liquid, passage means formed in said carriage member and communicating with a lower portion of said chamber means, a pair of annular seals mounted on said carriage member at opposite sides of said passage means and being engageable with said annular seat, piston means formed by said carriage member and engaging the walls of said cylinder to isolate said control port from said inlet port during movement of said carriage member, said carriage member being movable from a loading position in which said chamber means is in communication with said inlet port in response to a supply of increased pressure acting at one side of said piston means and from an unloading position in which said chamber means is in communication with said one end of said cylinder in response to constant pressure acting at the other side of said piston means and a decrease in pressure acting at said one side of said piston means.

6. In a moisture ejecting device having cylindrical body member presenting spaced portions open to an air pressure system and to the atmosphere, respectively; an annular seat formed in said cylinder; a carriage member mounted for reciprocating movement in said seat, said carriage member presenting a chamber communicating through an opening at a lower end thereof with said cylinder and being movable from a loading position in which said chamber is open to said air system, through an intermediate position in which said chamber is isolated from said air system and the atmosphere, and to an unloading position in which said chamber is open to the atmosphere; said carriage member having a pair of seals at opposite sides of said opening, one of said seals being in sealing engagement with said seat in said loading position, both of said seals being in engagement with said seat in said intermediate position, and the other of said seals being in engagement with said seat in said unloading position of said carriage member; said seals being responsive to an increase in pressure in said air system to move said carriage member to said unloading position, and means interposed between said carriage member and said cylinder to return said carriage from said unloading position to said loading position.

7. A device for discharging to atmosphere a liquid in a fluid pressure reservoir without directly connecting the reservoir with atmosphere comprising an elongated hollow casing having a stepped bore therein one part of which has a larger cross-sectional area than the other part, drain port means through said casing communicating with the larger bore part and adapted to receive fluid under pressure, a discharge port through said casing axially spaced from said drain port means and communicating the smaller bore part with atmosphere, an elongated cylindrical member slidably received in the smaller bore part in pressure-tight relationship therewith and co-acting with the casing so that one end of the cylindrical member always projects partly into said larger bore part, a liquid receiving cavity in said cylindrical member having a lateral opening extending through the wall thereof, the spacing of said drain port means and said discharge port being greater than the corresponding dimension of said opening, a piston member in said larger bore part integrally attached to the end of said cylindrical member extending into said larger bore part, the differential cross-sectional area between said piston and said cylindrical member forming an annular pressure receiving face, said face being exposed at all times to the pressure in the drain port means, means for periodically exerting a force on the opposite face of said piston in excess of the force exerted by pressure in the drain port means on the first mentioned face thereof, said opening in said cylindrical member and the part of the casing at which said bore is stepped and the discharge port in said casing being positioned with respect to each other that said opening is moved into communication with said discharge port only after it has moved out of communication with said drain port means when the force of drain port means pressure acting on said first mentioned face is less than the force on said second mentioned face and said opening is moved into communication with said drain port means only after it has moved out of communication with said discharge port when the force on said second mentioned face of said piston is less than the force on said first mentioned face.

8. In a moisture ejecting device for a compressed air system, in combination, a cylinder having spaced portions adapted to open to a source of compressed air and to the atmosphere, respectively, a carriage member supported in said cylinder for sliding movement, passage means formed in said carriage and communicating with said cylinder, said carriage member forming an ejection chamber above said passage means and communicating through a lower portion with said passage means, said cylinder having an intermediate portion forming an annular seat, said carriage member normally being disposed with said passage means at one side of said seat to receive liquid and air, said carriage member being movable through a position in which said passage means is sealed from said source and the atmosphere and to a position to dispose said passage means at the other side of said seat to discharge liquid and air from said chamber to the atmosphere, and means for moving said carriage member.

9. A moisture ejector for fluid pressure systems comprising a hollow body member, a seat portion formed in said body member, a carriage member slidably supported by said seat portion, said body member having a portion at one side of said seat adapted to communicate with a source of fluid pressure and having a second portion at the other side of said seat communicating with the atmosphere, said carriage member forming an ejection chamber therein, passage means formed in said carriage member adjacent a lower portion of said chamber only and placing said chamber in communication with said hollow body member, and means for moving said carriage member between positions in which said passage means is at one side of said seat portion to receive a supply of pressure fluid and moisture and a position in which said passage means is at the other side of said seat portion to exhaust said supply of fluid pressure and moisture, said passage means being closed by said seat to isolate said chamber from said source and the atmosphere when said carriage member is being moved between said positions.

10. A moisture ejecting device for a compressed air system comprising, a body member forming an elongated bore therein, an annular seat portion disposed in said bore, carriage member mounted in said bore for reciprocating movement in said seat portion, a pair of annular seal means mounted on said carriage member in spaced relation to each other, said carriage member forming an ejection chamber therein, passage means formed in said carriage member at a point between said seal means and communicating with a lower portion of said ejection chamber only, inlet means at one side of said seat portion adapted to receive liquid and compressed air, outlet means at the other side of said seat portion communicating with the atmosphere, said carriage means being movable from a position in which said passage means communicates with said inlet means to receive liquid therefrom and deliver it to a lower portion of said ejection chamber through an intermediate position in which both of said seal means are engaged with said seat to insolate said passage means from said inlet and outlet means and to a position in which said passage means communicates with said outlet means and air above said liquid forces it from said chamber, and means for moving said carriage member between said positions.

11. In a moisture ejecting device for an air system, the combination of, a hollow body member having an inlet portion and an outlet portion adapted to communicate with a source of air under pressure and the atmosphere, respectively, a cylindrical seat formed in said body member intermediate said portions, a carriage member supported in said body member for reciprocating movement in said seat, means forming a closed chamber in said carriage member, passage means formed in said carriage member adjacent a lower portion of said chamber and placing the latter in communication with said hollow body member, seal means mounted on said carriage at opposite sides of said passage means, said carriage member having a loading position in which one of said seals is in engagement with said seat to isolate said inlet portion from the atmosphere while maintaining said passage means in communication with said inlet portion to receive liquid in a bottom portion of said chamber and maintain air under pressure in an upper portion of said chamber, said chamber having an intermediate position in which both of said seals are in engagement with said seat to isolate said passage means from said inlet and outlet portions, said chamber having an unloading position in which the other of said seals is in engagement with said seat to isolate said inlet portion from the atmosphere and maintain said passage means in communication with the atmosphere whereby the air in the upper portion of said chamber forces liquid in a bottom portion of said chamber through said passage means to the atmosphere, and means for moving said carriage member between said loading and unloading positions while maintaining at least one of said seals in engagement with said seat.

12. A liquid ejecting device for a compressed air system comprising a body member forming a vertically extending bore, a seat member disposed in an intermediate portion of said bore, a carriage member supported in said seat member for reciprocable movement, said bore having inlet means at one side of said seat adapted to communicate with a source of compressed air and outlet means at the other side of said seat adapted to communicate with the atmosphere, said carriage member forming an ejection chamber, passage means in said carriage member extending radially from a bottom portion of said ejection chamber to said bore, seal means mounted on said carriage member above and below said passage means and being movable with said carriage member, guide means extending in opposite directions from said seat member and being engageable with said seals to guide said carriage member during movement thereof, and means for moving said carriage member from a position in which said passage means communicates with said inlet means for receiving liquid and air, through a position in which both of said seals are in an engagement with said seat to isolate said passage means from said inlet and outpuet means and to a position in which said passage means communicates with said outlet means and air in said chamber ejects liquid to the atmosphere.

References Cited in the file of this patent

UNITED STATES PATENTS

| | | |
|---|---|---|
| 101,225 | Case | Mar. 29, 1870 |
| 1,568,057 | Carr | Jan. 5, 1926 |
| 1,907,299 | Kudolla | May 2, 1933 |
| 2,007,358 | Anger | July 9, 1935 |
| 2,602,462 | Barrett | July 8, 1952 |
| 2,705,020 | Frantz | Mar. 29, 1955 |
| 2,958,294 | Woodmansee | Nov. 1, 1960 |